(12) United States Patent
Hallstadius et al.

(10) Patent No.: US 11,866,213 B2
(45) Date of Patent: Jan. 9, 2024

(54) METHOD FOR QUALITY ASSESSMENT OF A SEALING SECTION OF A PACKAGE, AND AN APPARATUS THEREOF

(71) Applicant: Tetra Laval Holdings & Finance S.A., Pully (CH)

(72) Inventors: Hans Hallstadius, Lund (SE); Magnus Räbe, Åkarp (SE); Viktor Petersson, Hjärup (SE); Daniel Zulumovski, Malmö (SE); Håkan Andersson, Veberöd (SE); Stefano Fantini, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 429 days.

(21) Appl. No.: 17/289,193

(22) PCT Filed: Oct. 21, 2019

(86) PCT No.: PCT/EP2019/078505
§ 371 (c)(1),
(2) Date: Apr. 27, 2021

(87) PCT Pub. No.: WO2020/088963
PCT Pub. Date: May 7, 2020

(65) Prior Publication Data
US 2021/0331823 A1     Oct. 28, 2021

(30) Foreign Application Priority Data
Oct. 31, 2018   (EP) ..................................... 18203794

(51) Int. Cl.
*G01N 21/90*        (2006.01)
*B65B 57/00*        (2006.01)
(Continued)

(52) U.S. Cl.
CPC .......... *B65B 57/00* (2013.01); *B29C 65/8253* (2013.01); *B29C 66/849* (2013.01);
(Continued)

(58) Field of Classification Search
CPC ..... B65B 57/00; B65B 9/207; B29C 65/8253; B29C 66/849; B29C 65/368;
(Continued)

(56) References Cited

U.S. PATENT DOCUMENTS 5,260,766 A      11/1993   Armitage
8,223,200 B1 *   7/2012    Benttine ............ G01N 21/8806
                                                   382/143
2001/0015056 A1* 8/2001    Hiramoto ............ B29C 65/7885
                                                   53/507

FOREIGN PATENT DOCUMENTS

JP      2005189175 A      7/2005
JP      2009085803 A      4/2009
(Continued)

OTHER PUBLICATIONS

International Search Report for corresponding Application No. PCT/EP2019/078505, dated Dec. 13, 2019.
(Continued)

*Primary Examiner* — Jonathan M Hansen
(74) *Attorney, Agent, or Firm* — Renner, Otto, Boisselle & Sklar, LLP

(57) ABSTRACT

A method for quality assessment of a sealing section of a package, wherein the package includes at least a robustness layer and a plastic layer. The sealing section is formed by holding a first section and a second section of the package against each other while providing heat such that the plastic layer of the first and second section melt and thereby provide for that the first and second section adhere to each other. The method includes capturing image data depicting the sealing (Continued)

section using a camera, identifying a reference line in the image data, identifying a sealing section boundary line in the image data, determining a sealing section assessment feature set based on the reference line and the sealing section boundary line, and comparing the sealing section assessment feature set with a reference feature set.

15 Claims, 10 Drawing Sheets

(51) Int. Cl.
| | | |
|---|---|---|
| *B29C 65/82* | (2006.01) | |
| *B29C 65/00* | (2006.01) | |
| *B65B 9/207* | (2012.01) | |
| *G01N 21/93* | (2006.01) | |
| *G06T 7/00* | (2017.01) | |
| *B29L 31/00* | (2006.01) | |

(52) U.S. Cl.
CPC ......... *B65B 9/207* (2013.01); *G01N 21/9054* (2013.01); *G01N 21/93* (2013.01); *G06T 7/001* (2013.01); *B29L 2031/7166* (2013.01)

(58) Field of Classification Search
CPC ............. B29C 66/1122; B29C 66/4312; B29C 66/72321; B29C 66/73921; B29C 65/3656; B29C 65/08; B29C 66/72328; G01N 21/9054; G01N 21/93; G01N 21/8806; G01N 21/8851; G01N 21/8803
See application file for complete search history.

(56) References Cited

FOREIGN PATENT DOCUMENTS

| | | |
|---|---|---|
| JP | 2011-063002 A | 3/2011 |
| WO | 2010/031026 A2 | 3/2010 |

OTHER PUBLICATIONS

Potente, H. et al., Heated-Tool/Cooled-Tool Welding—A New Process Variant for the Joining of Films, Welding and Cutting, DVS, No. 3, Jan. 1, 2003, pp. 132-136, XP001167989, ISSN: 1612-3433 (copy to be provided).

* cited by examiner

METHOD FOR QUALITY ASSESSMENT OF A SEALING SECTION OF A PACKAGE, AND AN APPARATUS THEREOF

TECHNICAL FIELD

The present patent application generally relates to the field of packaging. More specifically, it relates to quality assessment of sealing sections in packages e.g. for food products.

BACKGROUND ART

Carton-based packages for milk and other food products are well known and appreciated in many parts of the world. One example is the brick-shaped package Tetra Brik™ marketed by Tetra Pak. This package is produced in so-called roll-fed packaging machines. The general principle of this type of machines is to form a tube of packaging material, fill the tube with food product and form packages from a lower end of the tube. Since these steps are made continuously, an advantage is that speeds of 30 000 packages per hours or above can be achieved. Another type of packaging machines for producing packages for food products is so-called blanks-fed packaging machines. In this type of machines, the packaging material is provided in the form of blanks, that is, sleeve-shaped and pre-cut pieces of packaging material, which are filled and formed into packages one by one.

In both types of packaging machines, for each package, a top and a bottom are formed by sealing together two sections of the packaging material. Different sealing technologies, also known as welding technologies, are available today. For a packaging material comprising an Aluminum layer, induction heat sealing technology can be used. The general principle of this technology is to induce a current in the packaging material such that heat is generated. The heat in turn provides for that outer plastic layers in the packaging material melt such that these can adhere to each other when being held against each other. Another example of a sealing technology that can be used is ultrasonic sealing technology. This technology is instead of inducing the current, generating the heat by using ultrasound.

Irrespective of which sealing technology that is used, sealing sections are formed in the packages. These sealing sections provide for that the packages do not leak, but also, in particular for aseptic packages, that unwanted microorganisms cannot enter into the packages. There are different methods today for quality assessment of the sealing sections. A direct approach is to have an operator to look at the packages produced at regular intervals in order to detect deviations that may be caused by insufficient sealing. An example of an indirect approach used for detecting insufficient sealing is to close the packages while providing pressure on the sides such that inwardly bulging side sections are formed in the packages. In case the sealing sections are insufficient, air will leak into the packages resulting in that the side sections are no longer inwardly bulging. As an effect this will make it possible to easily spot packages that may have insufficient sealing sections.

Even though both direct and indirect approaches for detecting insufficient sealing sections in packages are available today, there is a need for improvement such that time and effort needed for identifying packages with insufficient sealing sections can be further reduced.

SUMMARY

It is an object of the invention to at least partly overcome one or more of the above-identified limitations of the prior art. In particular, it is an object to provide an apparatus and a method making it possible to easily and cost-efficiently identify insufficient sealing sections.

According to a first aspect it is provided a method for quality assessment of a sealing section of a package, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising capturing image data depicting the sealing section using a camera, identifying a reference line in the image data, identifying a sealing section boundary line in the image data, determining a sealing section assessment feature set based on the reference line, and the sealing section boundary line, and comparing the sealing section assessment feature set with a reference feature set.

The sealing section assessment feature set may comprise at least one distance measure between the reference line and the sealing section boundary line.

The method may further comprise determining a sealing section assessment area defined by the reference line and the sealing section boundary line, wherein the sealing section assessment feature set comprises the sealing section assessment area.

The method may further comprise determining a boundary line deviation measure by comparing the sealing section boundary line with an ideal sealing section boundary line, wherein the at least one sealing section assessment feature set comprises the first boundary line deviation measure.

The method may further comprise determining a reference line deviation measure by comparing the reference line with an ideal reference line, wherein the sealing section assessment feature set comprises the reference line deviation measure.

The method may further comprise identifying peripheral non-sealed sections having an open end facing the sealing section boundary line, determining depths of the peripheral non-sealed sections by determining minimum distances between the peripheral non-sealed sections and the reference line, wherein the at least one sealing section assessment feature set comprises the depth of the peripheral non-sealed sections.

The method may further comprise identifying internal non-sealed sections in the sealing section, determining areas of the internal non-sealed sections, wherein the sealing section assessment feature set comprises the areas of the internal non-sealed sections.

The sealing section assessment feature set may further comprise input sealing energy.

The reference line may depict a ridge impression section of the sealing section.

Alternatively, the reference line may depict a cutting line.

According to a second aspect it is provided an apparatus for quality assessment of a sealing section of a package, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the apparatus comprising a camera configured to capture image data depicting the sealing section, a processing device configured to identify a reference line in the image data, wherein the reference line depicts a ridge impression section of the sealing section, identify a sealing section boundary line in the image data, determine a sealing section assessment feature set based on the reference line and the sealing section boundary line, and compare the sealing section assessment feature set with a reference feature set.

The sealing section assessment feature set may comprise at least one distance measure between the reference line and the sealing section boundary line.

The reference line may depict a ridge impression section of the sealing section.

The processing device may further be configured to determine a sealing section assessment area defined by the reference line and the sealing section boundary line, wherein the sealing section assessment feature set comprises the sealing section assessment area.

According to a third aspect it is provided a computer program product comprising instructions which, when executed on a computer, cause the computer to carry out the method according to the second aspect. The step of capturing image data could be the step of reading image data from an image sensor such as CMOS or CCD. Alternative it could be receiving image data from the camera external from the device executing the computer program.

Still other objectives, features, aspects and advantages of the invention will appear from the following detailed description as well as from the drawings.

BRIEF DESCRIPTION OF THE DRAWINGS

Embodiments will now be described, by way of example, with reference to the accompanying schematic drawings, in which

FIG. 1b illustrates generally a piece of packaging material that may be formed into the package illustrated in FIG. 1a.

FIG. 4 generally illustrates a lower part of the package illustrated in FIG. 1a.

DETAILED DESCRIPTION

Figure 1A:
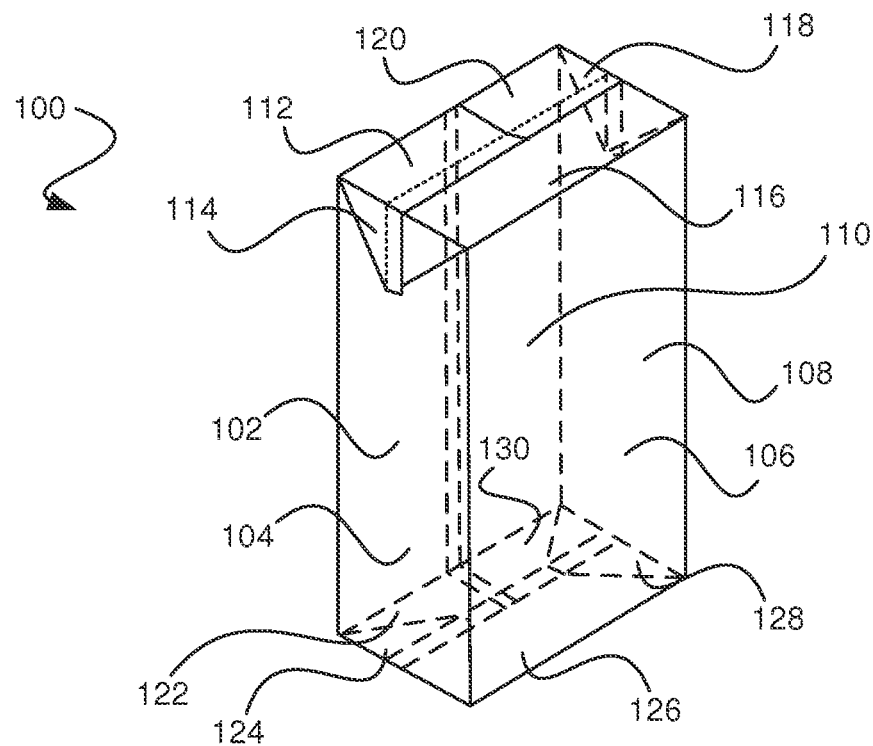
FIG. 1a is a perspective view of a package.
Figure 1B:
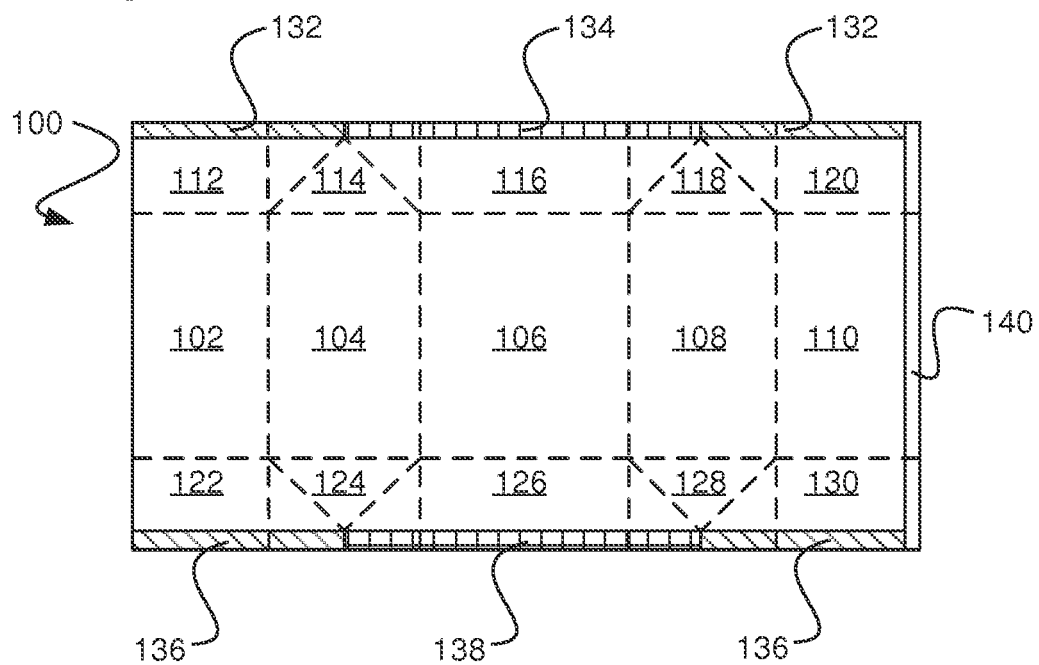

FIG. 1a generally illustrates an example of a carton package 100 made from a piece of package material illustrated in FIG. 1b. The carton package 100 comprises a number of panels divided from each other by weakening lines. The weakening lines provide for that the piece of packaging material can be reliably and efficiently folded into the package 100 by a packaging machine, also known as a filling machine.

In this example, the package 100 comprises a first rear panel 102, a left panel 104, a front panel 106, a right panel 108 and a second rear panel 110, which together form a sleeve-shaped main body of the package 100. The first and second rear panel 102, 110 are attached to each other by a so-called longitudinal sealing. In order to avoid that product held in the package comes into contact with interior layers of the packaging material a peripheral part of the second rear panel 110, that is placed inside a peripheral part of the first rear panel 102, can be protected by a plastic strip, sometimes referred to as a longitudinal sealing strip.

Further, the package 100 comprises a first top rear panel 112, a left corner top panel 114, a top front panel 116, a right corner panel 118 and a second top rear panel 120, which together form a top of the package 100. In a similar manner as the first and second rear panel 102, 110, the first and second rear top panels 112, 120 are attached to each other. In order to close the package 100, the first and second rear top panels 112, 120 are attached to the top front panel 116, two sections of the left corner top panel 114 are attached to each other, and two sections of the right corner top panel 118 are attached to each other. This is provided by a transversal sealing made in the packaging machine after the package is filled with the product.

The package 100 also comprises a first bottom rear panel 122, a left corner bottom panel 124, a bottom front panel 126, a right corner bottom panel 128 and a second bottom rear panel 130, which together form a bottom of the package. In a similar manner as the first and second rear panel 102, 110, the first and second bottom rear panels 122, 130 are attached to each other. In order to close the package 100 and thereby form the bottom, the first and second bottom rear panels 122, 130 are attached to the bottom front panel 126, two sections of the left corner bottom panel 124 are attached to each other, and two sections of the right corner bottom panel 128 are attached to each other.

In case the package 100 is produced in a roll-fed packaging machine, a number of pieces of packaging material is provided after one another on a reel of packaging material. By having the pieces of packaging material arranged in this way a transversal sealing forming the bottom can be made at the same time as a transversal sealing forming the top of a subsequent package is made. After having made the transversal sealings, the packages are separated from each other by cutting them apart in a section between the transversal sealings.

To form the transversal sealing, a first top sealing section 134 and a second top sealing section 132 as well as a first bottom sealing section 136 and a second top sealing section 138 can be provided. After having made the transversal sealing, the packaging material can be separated such that the first top sealing section 132 and the second top sealing section 134 form an upper part of the top of the package 100, and in the first bottom sealing section 136 and the second bottom sealing section 138 form a lower part of the bottom of the package 100. To form the longitudinal sealing, a longitudinal sealing section 140 can be used.

In case the package is produced in a blanks-fed packaging machine, the longitudinal sealing is provided beforehand, that is, the first rear panel 102 is attached to the second rear panel 110 via the longitudinal section 140, such that a sleeve-shaped piece of packaging material is provided. In addition, the separation, also referred to as cutting, is not made in the blanks-fed packaging machine, but is made when producing blanks to be fed into the blanks-fed packaging machine.

Figure 2:
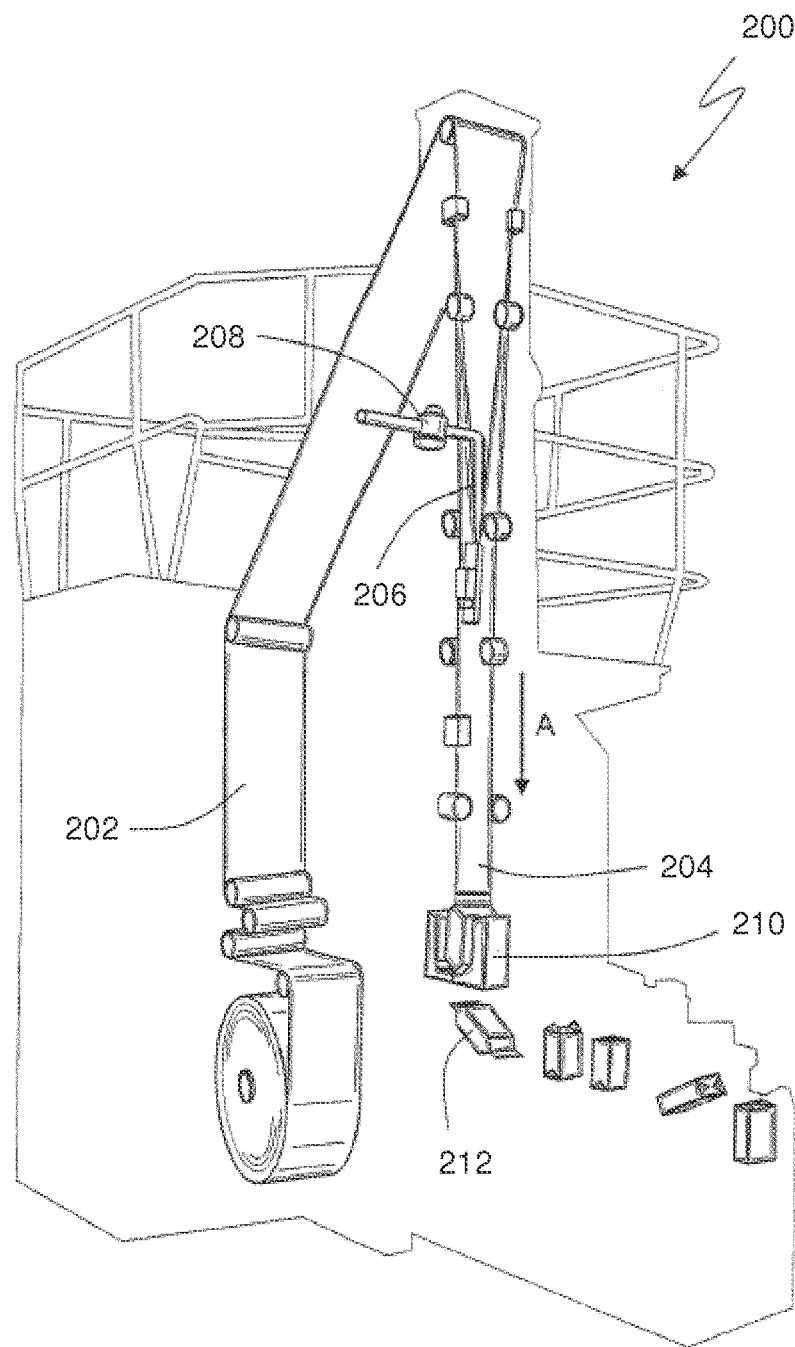
FIG. 2 generally illustrates a roll-fed packaging machine.

FIG. 2 generally illustrates a principle of the roll fed packaging machine 200. A web 202 of packaging material is provided via a reel and is fed through the packaging machine 200 in a feeding direction A. From the web 202 a tube 204 is formed. Food product can be fed into the tube 204 from above using a pipe 206 in combination with a valve 208. In a folding and sealing device 210 packages 212 are formed from the tube 204.

Figure 3:
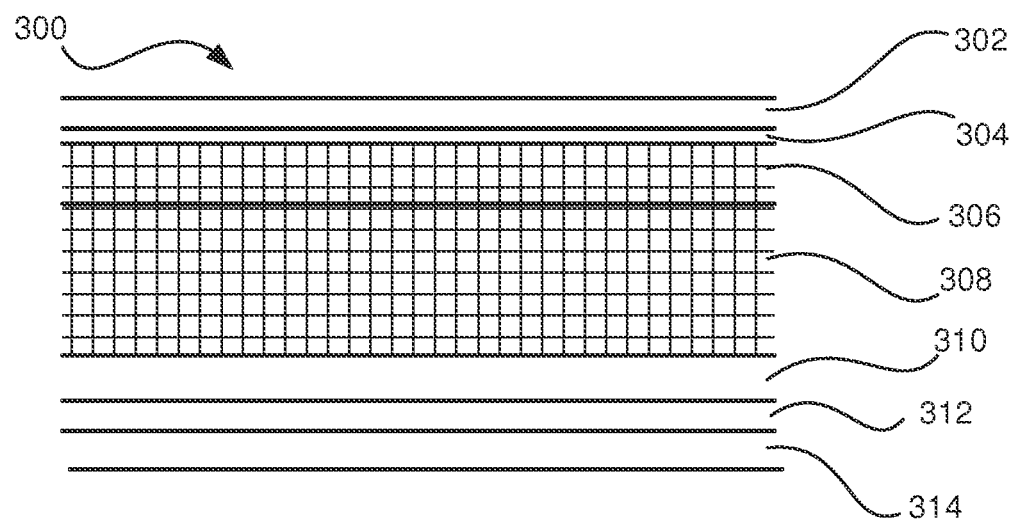
FIG. 3 is a cross-sectional view of a packaging material by way of example.

FIG. 3 generally illustrates by way of example a packaging material 300 that can be used for forming the package 100.

Facing the surrounding space, an outer coating 302 may be provided. The outer coating 302 may serve the purpose of avoiding that moisture of water is coming into contact with a printing layer 304 placed inside the outer coating 302. The printing layer 304 can comprise ink or any other material used for providing a print on the package 100.

Inside the printing layer 304, a first and a second paperboard layer 306, 308 can be provided. The first and second paperboard layers 306, 308 provide robustness to the package 100. The first paperboard layer 306 may be bleached paperboard with or without clay coat. The second paperboard layer 308 may be bleached or unbleached paperboard.

Next a lamination layer 310 made of plastic material can be provided. The lamination layer 310 can provide for that microorganisms are hindered from coming into contact with the product held inside the package 100.

Inside the lamination layer 310, an Aluminum foil 312 can be provided. The Aluminum foil 312 can provide for that light, oxygen and odors are hindered from coming into contact with the product held inside the package 100, but also that flavors inside the package can be released from the package 100. The Aluminum foil 312 does however not exist in all types of packaging material. For instance, in the packaging material used for packages for chilled products, i.e. products that will be refrigerated, the Aluminum foil 312 is most often left out and replaced by a combination of lamination layers and paperboard layers.

Closest to the product held inside the package 100, a first and a second internal coating 314, 316, made of e.g. plastics material, can be provided. One purpose with these are that the product is hindered from coming in direct contact with the Aluminum foil 312.

Figure 4:
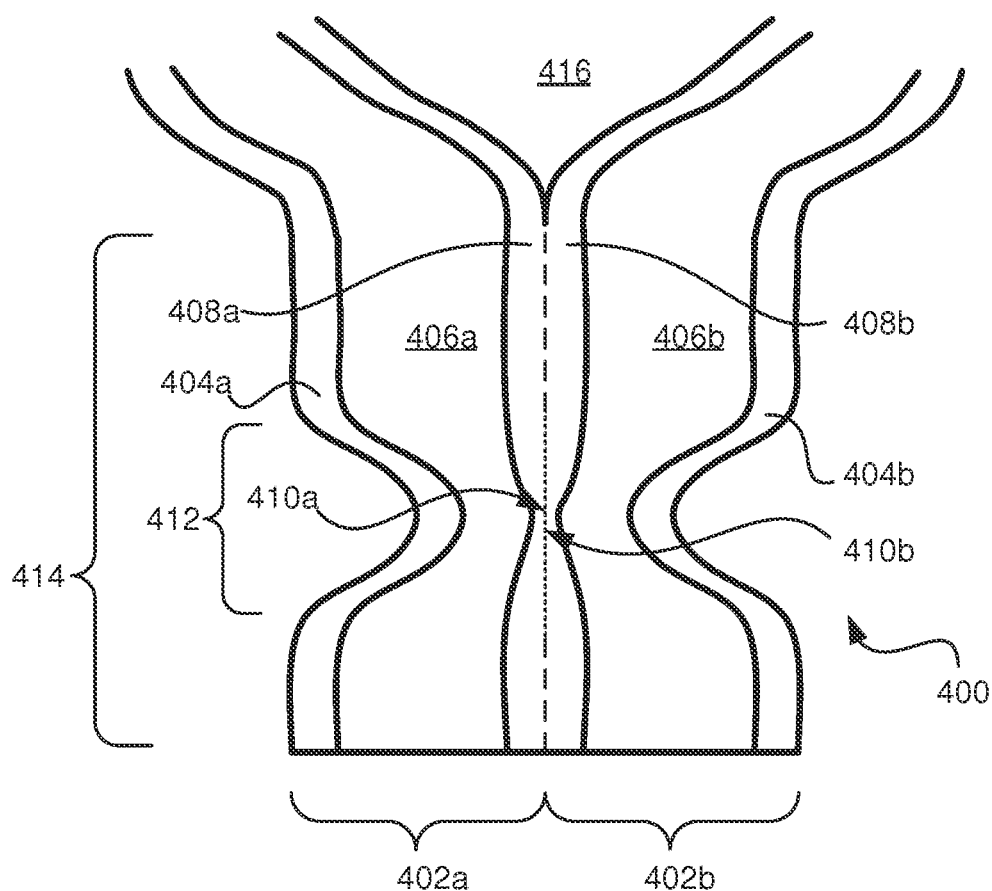

FIG. 4 generally illustrates a cross-sectional view of a lower part 400 of the package 100 in greater detail by way of example. The lower part 400 can be formed by a first section 402a and a second section 402b. Further, the package 100 can comprise an outer layer 404a, 404b, a robustness layer 406a, 406b, which may be a carton layer, and a plastic layer 408a, 408b. As illustrated in FIG. 3, these different layers may in turn comprise a plurality of layers. During a sealing step in the packaging machine 200, the plastic layer 408a, 408b can be heated such that this melt, e.g. by using induction heat sealing technology or ultrasonic sealing. By combining this with holding the first and second sections 402a, 402b against each other, the plastic layer 408a, 408b can form a merged layer 410a, 410b is formed, which in turn provides for that the lower part 400 can be formed.

During the sealing step, when holding the first and second sections 402a, 402b against each other, a sealing element provided with a ridge can be used. The ridge provides for that additional pressure can be provided in a ridge impression area 412, which can be a sub-area of a sealing section 414.

Figure 5:
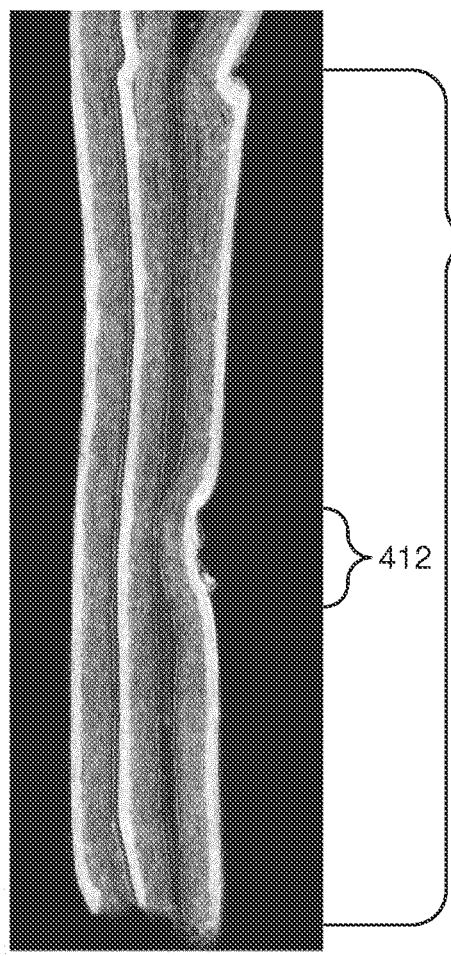
FIG. 5 illustrates an example of a cross-sectional view of a sealing section.

FIG. 5 illustrates an example of a cross-sectional view of the sealing section 414 and the ridge impression area 412 in the package 100 in more detail.

Figure 6:
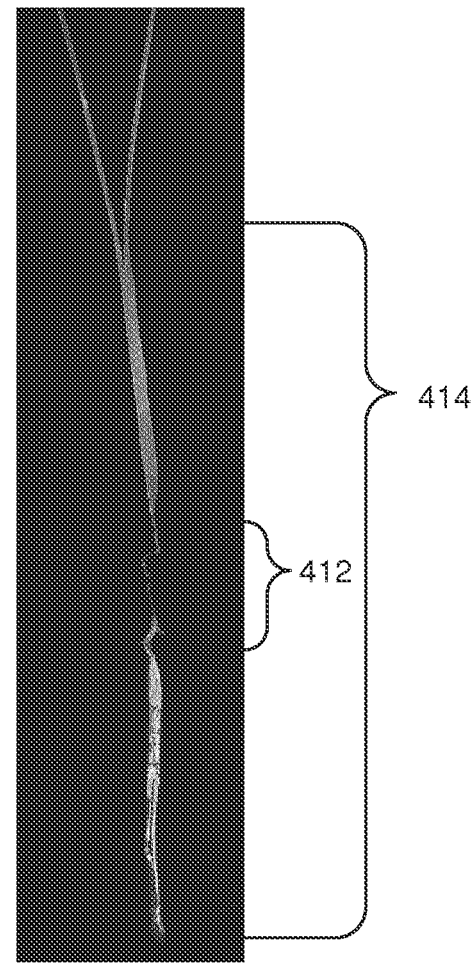
FIG. 6 illustrates another example of a cross-sectional view of the sealing section.

FIG. 6 illustrates yet another cross-sectional view of the sealing section by way of example. However, in the example illustrated in FIG. 6, all layers but the plastic layers 408a, 408b have been removed such that it is clearly illustrated how the plastic layers 408a, 408b are affected by the sealing step. The plastic layers 408a, 408b are namely affected in that these are made thinner due to the pressure applied during the sealing step.

Figure 7:
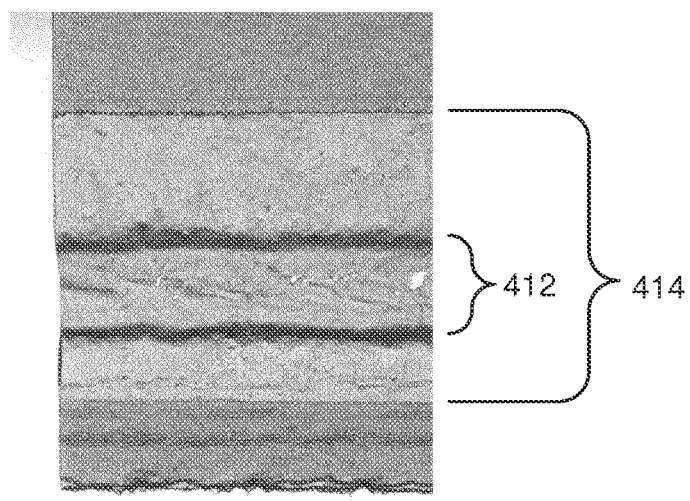
FIG. 7 illustrates an example of a front view of the sealing section.

FIG. 7 illustrates still another example of the sealing section 414, but as a front view. An effect of that the plastic layers 408a, 408b are affected during the sealing step is that light when being transmitted through the lower part 400, or any other part comprising the sealing section 414, will be facing different refractive indexes. This in turn provides for that by illuminating the lower part 400 in a controlled manner a quality assessment of the sealing section 414 can be made.

Figure 8A:
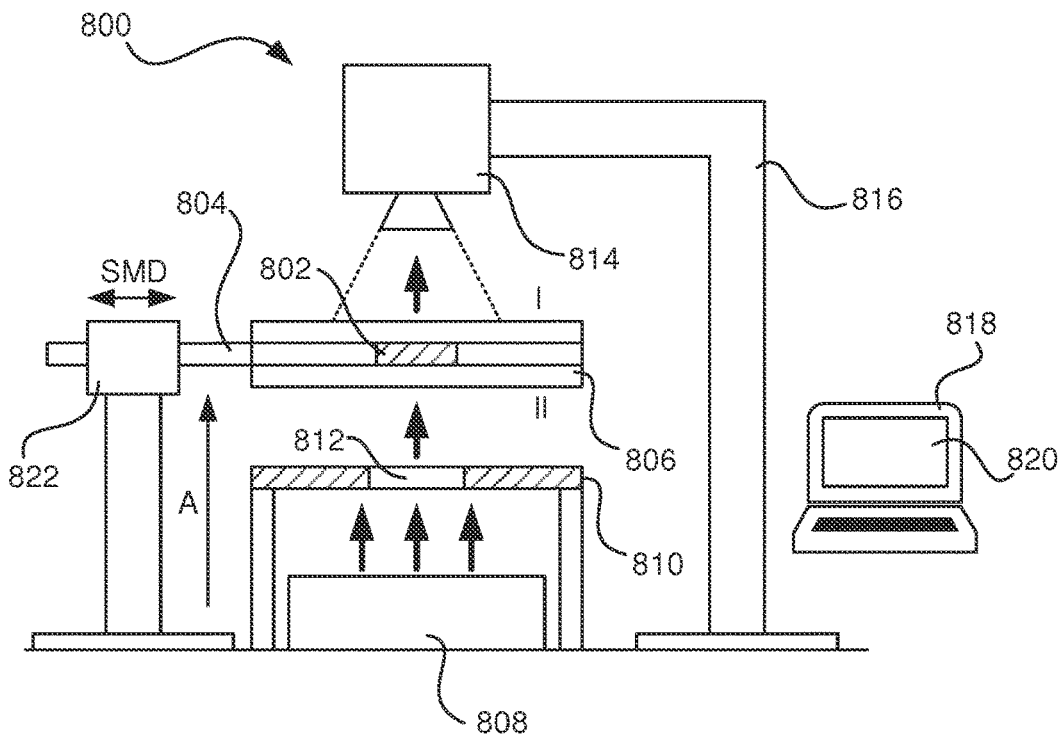
FIG. 8a-c generally illustrates by way of example an apparatus for quality assessment of the sealing section.
Figure 8B:
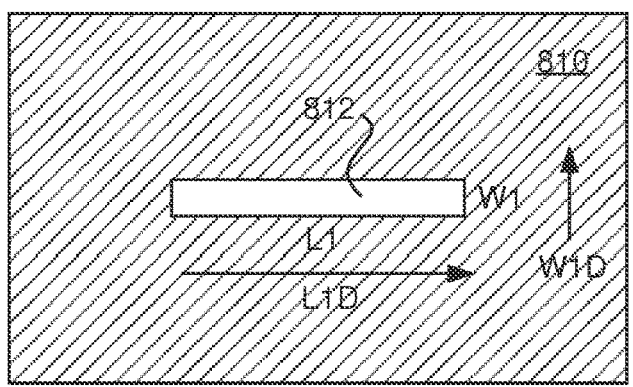
Figure 8C:
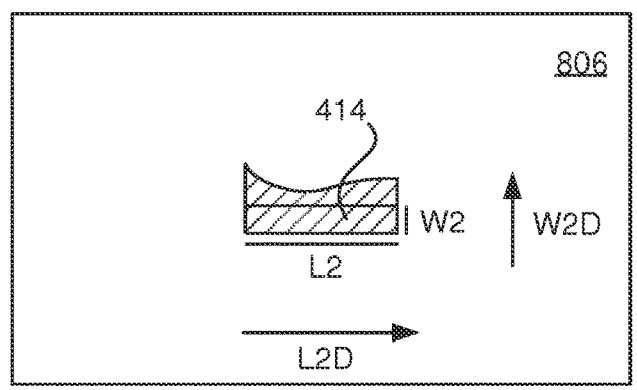

FIG. 8a-c generally illustrates by way of example an apparatus 800 for quality assessment of the sealing section 414 that is making use of the fact that light transferred through the sealing section 414 is affected differently depending on how the packaging material 300 has been affected during the sealing step.

As illustrated in FIG. 8a, a sample 802, which may be the lower part 400 illustrated in FIG. 4, can be placed in a sample holder 804 comprising a number of transparent plates 806. Light is provided by an illumination device 808, placed on a first side I of the sample holder 804, through a light controlling device 810 provided with a light emitting area 812. After being transmitted through the number of transparent plates 806 and the sample 802, the light is captured by a camera 814 that can be connected to a camera holder 816, wherein the camera 814 can be placed on a second side II of the sample holder 804.

Image data captured by the camera 814 can be transferred to a computer 818, which may be a lap top computer as illustrated, but also an embedded processing device in the camera 814 or any other processing device configured for handling image data. The computer 818 may be equipped with a screen 820.

FIG. 8b illustrates the light controlling device 810 from a top view. The light emitting area 812 may have a first length L1 extending in a first length direction L1D and a first width W1 extending in a first width direction W1D. The first length direction L1D and the first width direction W1D can be perpendicular. The first length L1 may be greater than the first width W1.

FIG. 8c illustrates the number of transparent plates 806 from a top view. The sample 802 comprising the sealing section 414 may have a second length L2 extending in a second length direction L2D and a second width W2 extending in a second width direction W2D. The second length direction L2D and the second width direction W2D can be perpendicular. The second length L2 may be greater than the second width W2. The sample 802 can be placed such that the first length direction L1D is parallel with the second length direction L2D.

Figure 9A:
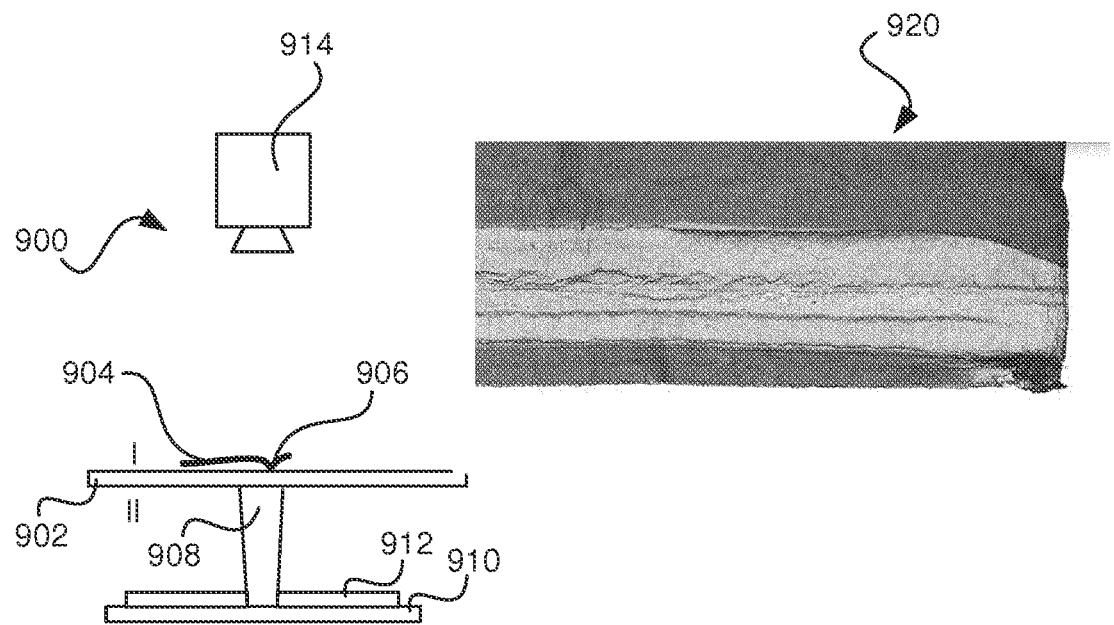
FIGS. 9a and 9b generally illustrate two other examples of the apparatus.
Figure 9B:
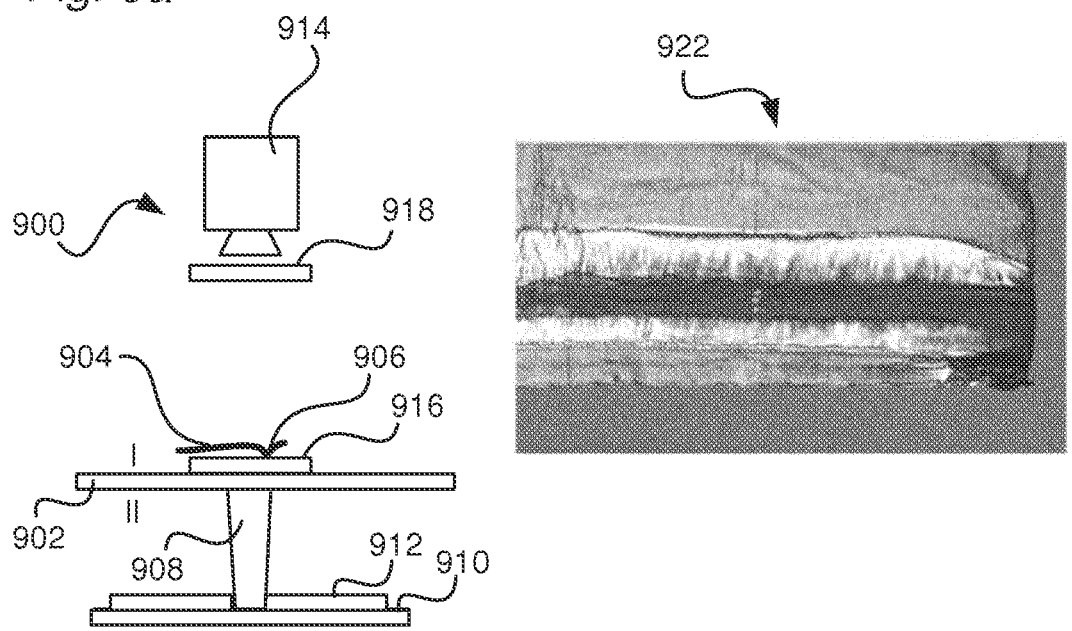

FIGS. 9a and 9b illustrate two examples of apparatuses 900 for quality assessment of the sealing section 414. In FIG. 9a, the apparatus 900 is illustrated without polarizing filters and in FIG. 9b the apparatus 900 is illustrated with polarizing filters.

More specifically, as illustrated in FIG. 9a, a sample holder 902 can be provided for holding a sample 904 having a ridge impression area 906. Light 908 is emitted from an illumination device 910 and passing a light controlling device 912 before reaching the sample holder 902 and the sample 904. The light passing through the sample holder 902 and the sample 906 can be captured by a camera 914.

As illustrated in FIG. 9b, the apparatus 900 further comprises a first polarizing filter 916 placed between the sample holder 902 and the sample 904, and a second polarizing filter 918 placed between the sample 904 and the camera 914. The first polarizing filter 916 may be a −45 degrees polarizing filter, and the second polarizing filter 918 may be a +45 degrees polarizing filter. An effect of having the polarizing filters 916, 918 can be that only light whose polarity is affected when being transferred through the sealing section 904 is captured by the camera 914.

The light controlling device may also be used such that image data can be captured with the light controlling device in a diffusor light position as well as with the light controlling device in a high contrast position. Having image data captured in two different light settings has the advantage that different features may be determined more accurately. This could be combined using different polarized light e.g. high contrast and diffusor light. The linear polarized light can have different angles like 0°, 30°, 45°, 90° etc. versus the sample and this has the advantage that different features may be determined in the images. It is also possible to use circular polarization that also have the advantage of giving the possibility to detect different features in the image.

Figure 10:
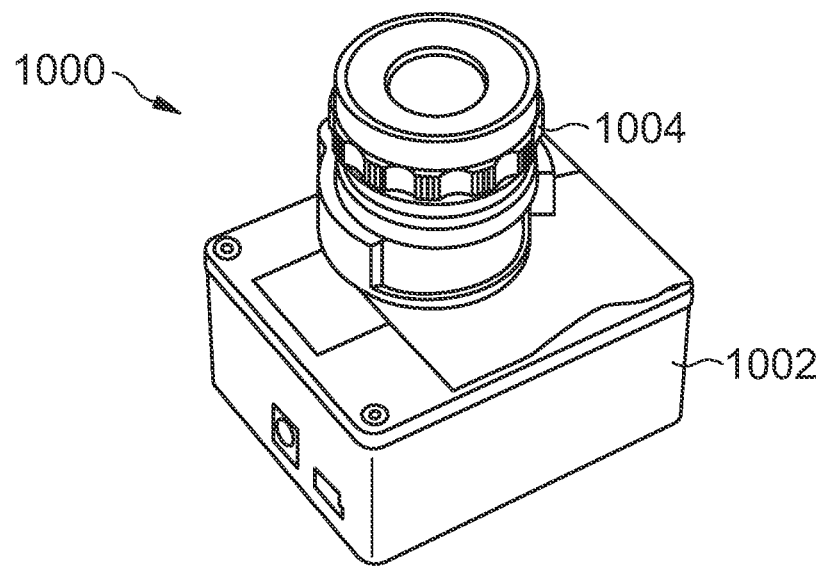
FIG. 10 illustrates by way of example an embodiment of the apparatus.

The apparatus 1000 may be embodied in a number of different ways. An example of an embodiment of the apparatus 1000 is illustrated in FIG. 10. In this embodiment there is no camera provided for capturing the light transferred through the sealing section, but instead only a sample holder 1002, in turn comprising inter alia an illumination device, and a magnification device 1004 are provided. To assess the quality of the sealing section, an operator, i.e. a user, can look at the sealing section through the magnification device 1004. In case a camera is provided the magnification device 1004 can form part of the camera.

Figure 11A:
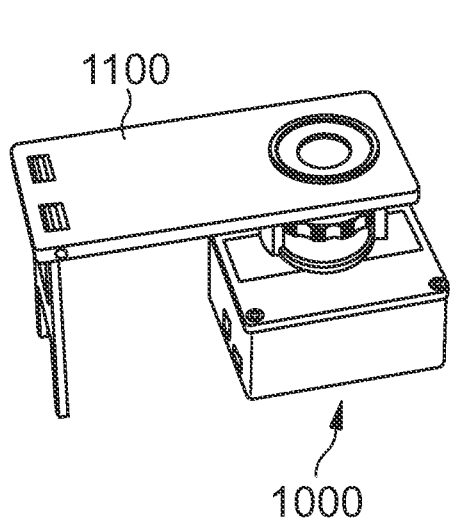
FIG. 11a-b illustrates by way of example another embodiment.
Figure 11B:
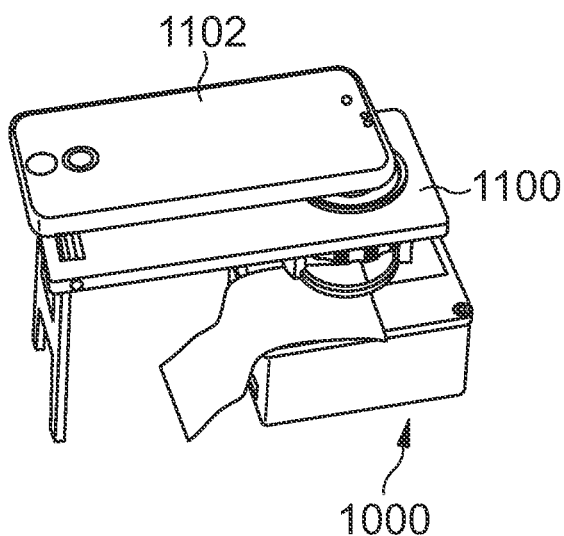

FIGS. 11a and 11b illustrate another embodiment of the apparatus 1000. In line with the embodiment of the apparatus 1000 illustrated in FIG. 10 the sample holder 1002 and the magnification device 1004 can be provided. However, in addition to the embodiment illustrated in FIG. 10, a camera holder 1100 can be provided. By using the camera holder 1100, a mobile phone 1102 with a camera, or any other camera-equipped device, may be placed such that image data may be captured using the camera of the mobile phone 1102.

Figure 12:
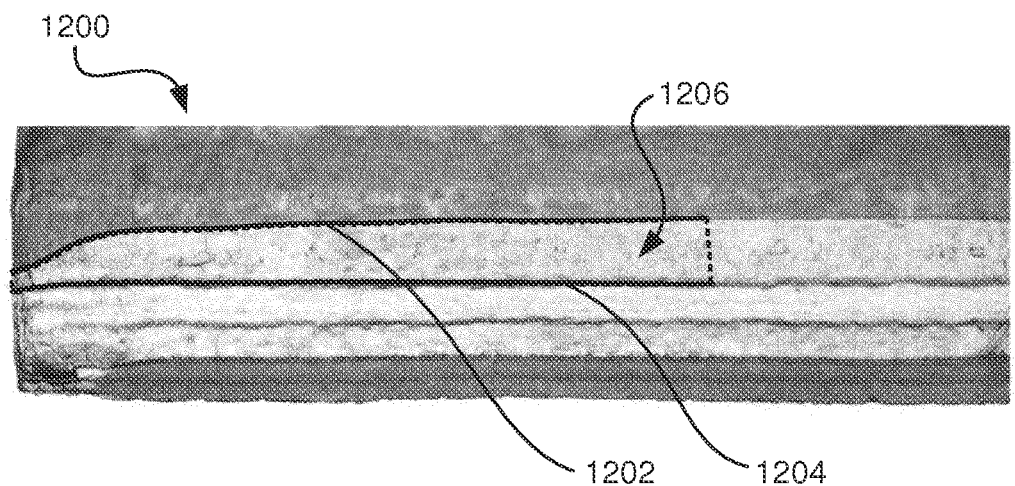
FIG. 12 is an example of a cross-sectional view of the sealing section.

To assess the quality of the sealing section, different features may be taken into account. FIG. 12 illustrates an example of the sealing section 1200. In this example, a sealing boundary line 1202 is determined using image analysis algorithms. This may be done by utilizing that there is a difference in pixel values between pixels not belonging to the sealing section, i.e. placed above the sealing boundary line 1202 in FIG. 12, and pixel values in pixels belonging to the sealing section, i.e. placed below the sealing boundary line 1202 in FIG. 12. Further, a reference line 1204 may be determined. In this example the reference line 1204 is based on a ridge impression line, i.e. a line formed by a ridge placed on one or both of sealing jaws used in the sealing step. Instead of using the ridge impression line as the reference line 1204, a cutting line, i.e. the end of the package, may be used as the reference line. When having determined both the sealing boundary line 1202 and the reference line 1204, a sealing section assessment area 1206 may be determined. Even though illustrated as only covering a part of a width of the package, it should be understood that the sealing section 1206 may cover a full width of the package. Further, instead of determining the sealing section 1206 based on an upper sealing boundary line, illustrated as the sealing boundary line 1202, and the reference line 1204, the sealing section assessment area 1206 may be based on a lower sealing boundary line, placed on an opposite side of the reference line 1204, and the reference line 1204. Still an option is to determine the sealing section assessment area 1206 on the upper and lower sealing boundary lines. If using this option the reference line 1204 may be used as a guidance for reliably identifying the upper and lower sealing boundary lines.

Instead of or in combination with determining the sealing section assessment area 1206, one or several distance measures between the reference line 1204 and the sealing section boundary line 1202 may be determined.

As pointed out above, different features may be taken into account when assessing the quality of the sealing section. The sealing section area 1206 may be one of these features. The different features may form a sealing section assessment feature set. Even though, as a general rule, a plurality of features taking different aspects into account will improve a reliability of the assessment, the sealing section assessment feature set may comprise only one feature as well.

Figure 13:
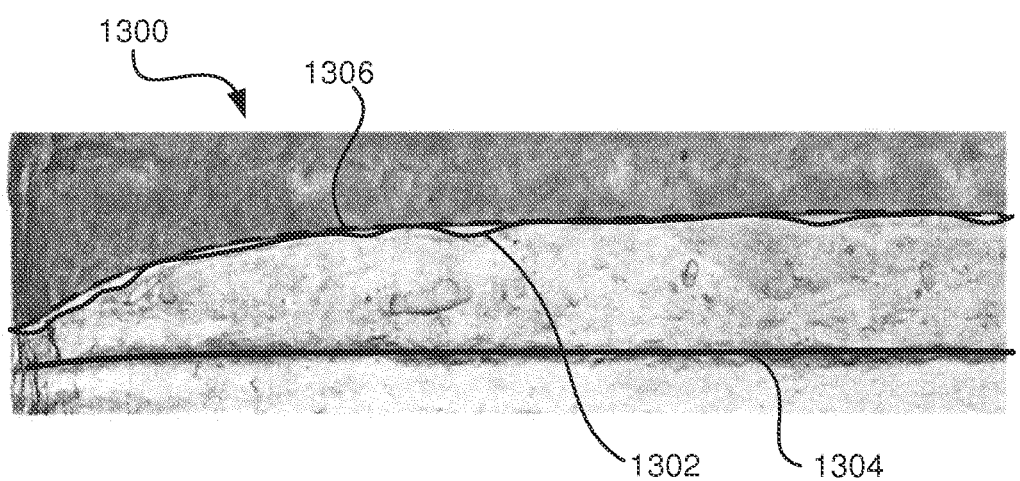
FIG. 13 is another example of a cross-sectional view of the sealing section.

Another feature that may form part of the sealing section assessment feature set is a boundary line deviation measure. FIG. 13 illustrates an example of the sealing section 1300 in which this measure is determined. As illustrated in FIG. 12, the sealing section boundary line 1302 and the reference line 1304 may be determined. To determine the boundary line deviation measure, an ideal sealing section boundary line 1306 may be used. The ideal sealing section boundary line 1306 may be determined in different ways. One way of determining it is to use the reference line 1304. Based on the reference line 1304 and a theoretical model it can namely be determine how the sealing section boundary line 1302 should be in an ideal situation. As is illustrated in FIG. 13, the sealing section boundary line 1302, being an actual boundary line of the sealing section, and the ideal sealing section boundary line 1306, being a theoretical boundary line, i.e. a setpoint value, deviate from each other in some points. As a general rule, the more the two deviates, the higher likelihood that the sealing is insufficient.

Figure 14:
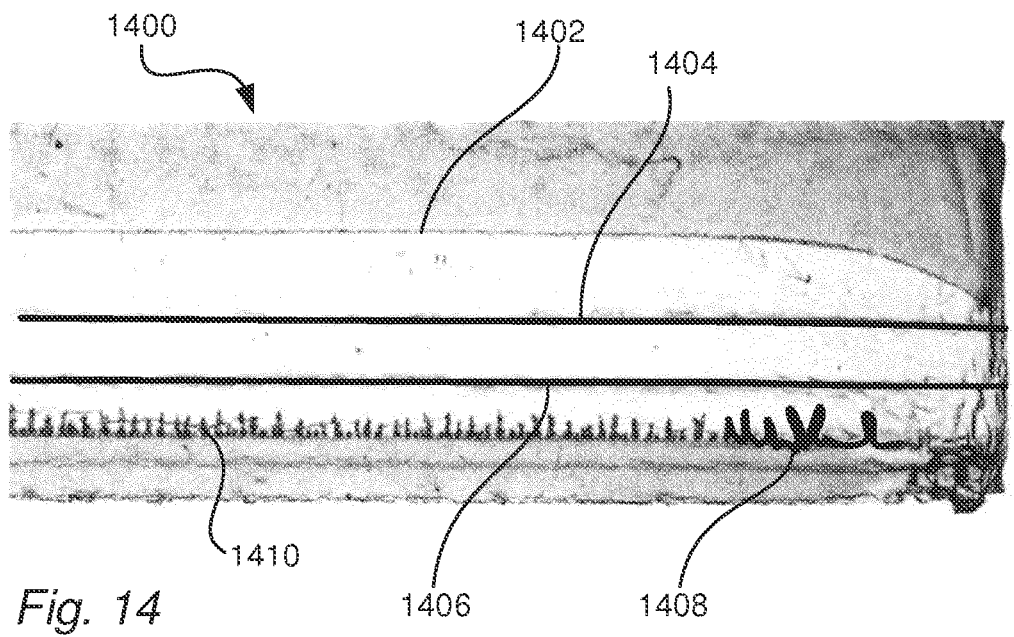
FIG. 14 is still another example of a cross-sectional view of the sealing section.

Still another feature that may form part of the sealing section assessment feature set is illustrated by way of example in FIG. 14. In this example, the sealing section comprises an upper sealing section boundary line 1402, a first reference line 1404, a second reference line 1406 and a lower sealing section boundary line 1408. The first and second reference line 1404, 1406 may be a first and a second ridge impression line.

As illustrated in FIG. 14, the lower sealing section boundary line 1408 may comprise peripheral non-sealed sections 1410. Depths of these peripheral non-sealed sections 1410 may be determined and may be used as a feature of the sealing section assessment feature set. As a general rule, the deeper peripheral non-sealed sections 1410, the higher likelihood that the sealing is insufficient.

Figure 15:
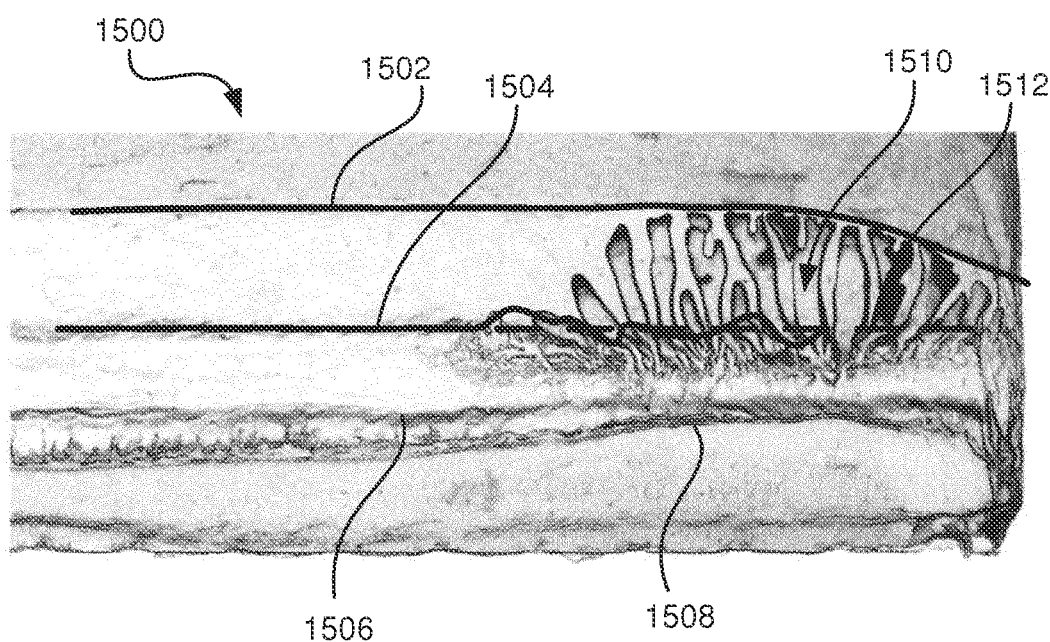
FIG. 15 is yet another example of a cross-sectional view of the sealing section.

FIG. 15 illustrates yet another example of the sealing section 1500. In line with the example illustrated in FIG. 14, the sealing section 1500 comprises the upper sealing section boundary line 1502, the first reference line 1504, the second reference line 1506 and the lower sealing section boundary line 1508. However, unlike the example illustrated in FIG. 14, the example illustrated in FIG. 15 comprises internal non-sealed sections 1510. Since the internal non-sealed sections 1510 may be an indication of that the sealing is not sufficient, areas of the internal non-sealed sections 1510 can be determined and form part of the sealing section assessment feature set. Even though a plurality of internal non-sealed sections 1510 is illustrated by way of example, a single internal non-sealed section may be used as well. As a general rule, the larger area of the non-sealed sections 1510, the higher likelihood that the sealing is insufficient.

Yet another feature that may form part of the sealing section assessment feature set is a reference line deviation measure. This feature may be determined by comparing the reference line, in the illustrated example in FIG. 15 the first reference line 1504 is used, with an ideal reference line 1512. The ideal reference line 1512 may be determined in different ways. One option to determine the ideal reference line 1512 is by fitting a straight line to a number of observations made when identifying the reference line 1504, e.g. by using regression analysis. One situation when assuming that the reference line 1506 should be a straight line is correct is when the reference line 1504 depicts the ridge impression line and the ridge of the sealing jaw is straight. As a general rule, the more the two deviate, the higher likelihood that the sealing is insufficient.

Further, the sealing section assessment feature set may comprise input sealing energy. By registering an amount of energy input during the sealing step, a reference feature set may be adapted such that in case e.g. the sealing section assessment area 1206 depends on the energy used during the sealing this may be compensated for. The input sealing energy may also be used to determine if insufficient sealing has been achieved in a direct manner. For instance, if the input sealing energy is above a set threshold this may be indication that the sealing was not correctly performed and hence that there is an increased risk that the sealing section does not fulfil set quality conditions.

Instead of using the ridge impression line as the reference line, a cutting line, i.e. an edge of the package, may be used as the reference line. Further, still an option is to use both the ridge impression line and the cutting line as reference lines.

Figure 16:
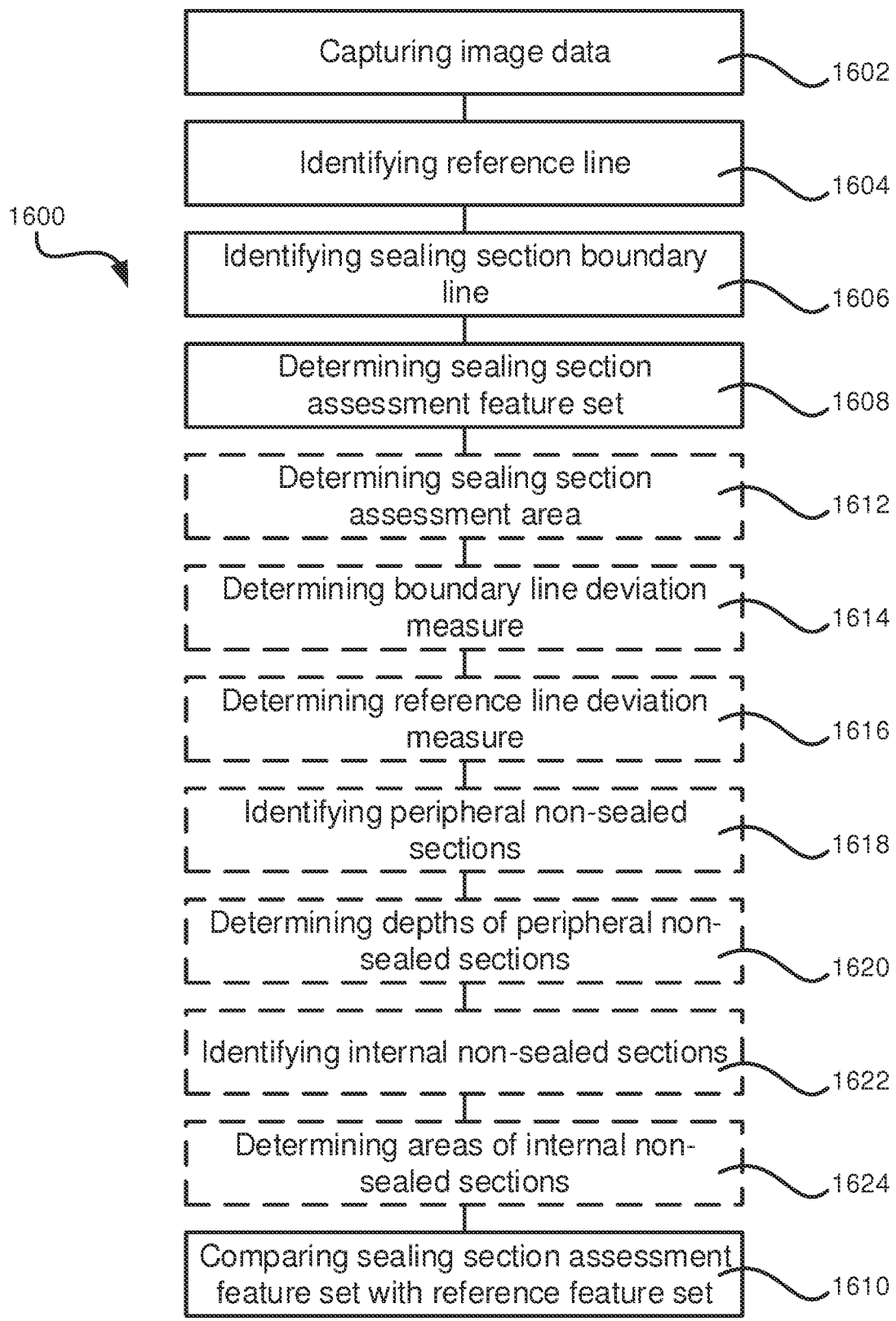
FIG. 16 is a flowchart illustrating steps of a method for quality assessment of the sealing section.

FIG. 16 is a flowchart illustrating steps of a method for quality assessment of the sealing section 414. In a first step 1602, image data can be captured. In the image data, in a second step 1604, the reference line 1204, 1304, 1404, 1504 can be identified. Thereafter, a sealing section boundary line 1202, 1302, 1402, 1502 can be identified in a third step 1606. Based on the reference line 1204, 1304, 1404, 1504 and the sealing section boundary line 1202, 1302, 1402, 1502, a sealing section assessment feature set can be determined in a fourth step 1608. In a fifth step 1610, the sealing section assessment feature set can be compared with a reference feature set. In case a match is found, within a tolerance interval, the sealing section can be considered to fulfil set conditions, i.e. that sufficient sealing has been achieved.

Optionally, in a sixth step 1612, based on the reference line and the sealing section boundary line the sealing section assessment area 1206 may be determined and form part of the sealing section assessment feature set.

Optionally, in a seventh step 1614, the boundary line deviation measure can be determined by comparing the sealing section boundary line 1302 with the ideal sealing section boundary line 1306 and form part of the sealing section assessment feature set.

Optionally, in an eighth step 1616, the reference line deviation measure can be determined by comparing the reference line 1504 with the ideal reference line 1512 and form part of the sealing section assessment feature set.

Optionally, in a ninth step 1618, the peripheral non-sealed sections 1410 can be identified, and, in a tenth step 1620, the depths of the peripheral non-sealed sections 1410 can be determined and form part of the sealing section assessment feature set.

Optionally, in an eleventh step 1622, the internal non-sealed sections 1510 can be identified, and, in a twelfth step 1624, the areas of the internal non-sealed sections 1510 can be determined and form part of the sealing section assessment feature set.

Even though the steps are presented in a specific order, this is to be seen as one example out of many possibilities.

From the description above follows that, although various embodiments of the invention have been described and shown, the invention is not restricted thereto, but may also be embodied in other ways within the scope of the subject-matter defined in the following claims.

The invention claimed is:

1. A method for quality assessment of a sealing section of a package, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the method comprising:
 capturing image data depicting the sealing section using a camera,
 identifying a reference line in the image data,
 identifying a sealing section boundary line in the image data,
 determining a sealing section assessment feature set based on the reference line and the sealing section boundary line, and
 comparing the sealing section assessment feature set with a reference feature set.

2. The method according to claim 1, wherein the sealing section assessment feature set comprises at least one distance measure between the reference line and the sealing section boundary line.

3. The method according to claim 1, further comprising:
 determining a sealing section assessment area defined by the reference line and the sealing section boundary line,
 wherein the sealing section assessment feature set comprises the sealing section assessment area.

4. The method according to claim 1, further comprising:
 determining a boundary line deviation measure by comparing the sealing section boundary line with an ideal sealing section boundary line,
 wherein the at least one sealing section assessment feature set comprises the first boundary line deviation measure.

5. The method according to claim 1, further comprising:
 determining a reference line deviation measure by comparing the reference line with an ideal reference line,
 wherein the sealing section assessment feature set comprises the reference line deviation measure.

6. The method according to claim 1, further comprising:
 identifying peripheral non-sealed sections having an open end facing the sealing section boundary line, determining depths of the peripheral non-sealed sections by determining minimum distances between the peripheral non-sealed sections and the reference line, wherein the at least one sealing section assessment feature set comprises the depth of the peripheral non-sealed sections.

7. The method according to claim 1, further comprising:

identifying internal non-sealed sections in the sealing section, determining areas of the internal non-sealed sections, wherein the sealing section assessment feature set comprises the areas of the internal non-sealed sections.

8. The method according to claim 1, wherein the sealing section assessment feature set further comprises input sealing energy.

9. The method according to claim 1, wherein the reference line depicts a ridge impression section of the sealing section.

10. The method according to claim 1, wherein the reference line depicts a cutting line.

11. An apparatus for quality assessment of a sealing section of a package, wherein the package comprises at least a robustness layer and a plastic layer, wherein the sealing section is formed by holding a first section and a second section of the package against each other while providing heat such that the plastic layer of the first and second section melt and thereby provide for that the first and second section adhere to each other, the apparatus comprising:

a camera configured to capture image data depicting the sealing section, a processing device configured to identify a reference line in the image data, wherein the reference line depicts a ridge impression section of the sealing section, identify a sealing section boundary line in the image data, determine a sealing section assessment feature set based on the reference line and the sealing section boundary line, and compare the sealing section assessment feature set with a reference feature set.

12. The apparatus according to claim 11, wherein the sealing section assessment feature set comprises at least one distance measure between the reference line and the sealing section boundary line.

13. The apparatus according to claim 11, wherein the reference line depicts a ridge impression section of the sealing section.

14. The apparatus according to claim 11, wherein the processing device is further configured to determine a sealing section assessment area defined by the reference line and the sealing section boundary line, wherein the sealing section assessment feature set comprises the sealing section assessment area.

15. A non-transitory computer readable medium having stored thereon a computer program product comprising instructions which, when executed on a computer, cause the computer to carry out the method of claim 1.

* * * * *